(12) United States Patent
Maro

(10) Patent No.: US 12,089,526 B2
(45) Date of Patent: Sep. 17, 2024

(54) PRESSURE BALANCED METER ASSEMBLY AND METHOD OF USE

(71) Applicant: Deere & Company, Moline, IL (US)

(72) Inventor: Randall A. Maro, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 435 days.

(21) Appl. No.: 17/387,014

(22) Filed: Jul. 28, 2021

(65) Prior Publication Data

US 2022/0053687 A1  Feb. 24, 2022

Related U.S. Application Data

(60) Provisional application No. 63/067,938, filed on Aug. 20, 2020.

(51) Int. Cl.
| | | |
|---|---|---|
| A01C 7/08 | (2006.01) | |
| A01C 7/10 | (2006.01) | |
| A01C 15/00 | (2006.01) | |

(52) U.S. Cl.
CPC .............. *A01C 7/102* (2013.01); *A01C 7/082* (2013.01); *A01C 15/007* (2013.01)

(58) Field of Classification Search
None
See application file for complete search history.

(56) References Cited

U.S. PATENT DOCUMENTS

| | | | | |
|---|---|---|---|---|
| 2,918,331 A * | 12/1959 | Fox, Jr. | ................. | E21B 21/062 |
| | | | | 406/68 |
| 2,933,208 A * | 4/1960 | Frank | ....................... | D21D 1/32 |
| | | | | 406/67 |
| 3,797,890 A * | 3/1974 | Walters | .................. | B65G 53/06 |
| | | | | 406/33 |
| 5,620,116 A * | 4/1997 | Kluger | ............... | B65G 53/4633 |
| | | | | 222/368 |
| 5,980,163 A | 11/1999 | Gregor et al. | | |
| 7,104,207 B2 * | 9/2006 | Wake | ...................... | A01C 7/081 |
| | | | | 222/129 |
| 7,413,387 B2 * | 8/2008 | Pleyer | ................... | B65G 53/58 |
| | | | | 406/67 |
| 9,615,505 B2 * | 4/2017 | Bent | ...................... | A01C 7/084 |
| 9,814,173 B2 * | 11/2017 | Frasier | .................. | B65G 53/60 |
| 10,448,562 B2 * | 10/2019 | Henry | ................... | A01C 7/102 |
| 10,524,410 B2 * | 1/2020 | Schoeny | ............... | A01C 7/102 |
| 10,568,256 B2 * | 2/2020 | Frasier | .................. | B65G 53/46 |
| 11,229,158 B1 * | 1/2022 | Janelle | ................ | A01C 15/003 |

(Continued)

FOREIGN PATENT DOCUMENTS

| | | |
|---|---|---|
| CA | 2909260 A1 | 4/2017 |
| DE | 102009025761 A1 | 11/2010 |

OTHER PUBLICATIONS

Extended European Search Report and Written Opinion issued in European Patent Application No. 21190566.6, dated Jan. 11, 2022, in 10 pages.

*Primary Examiner* — Joseph A Dillon, Jr.

(74) *Attorney, Agent, or Firm* — Taft Stettinius & Hollister LLP; Stephen F. Rost

(57) ABSTRACT

A meter assembly for an agricultural machine includes a meter, a conduit, and a bypass. The meter includes a roller to move commodity to the conduit. The bypass is coupled to the conduit and the meter to facilitate air flow therebetween free of interference from the roller or the commodity.

18 Claims, 6 Drawing Sheets

(56) References Cited

U.S. PATENT DOCUMENTS

| | | | | |
|---|---|---|---|---|
| 11,388,854 | B2* | 7/2022 | Jagow | A01C 7/06 |
| 2010/0101467 | A1* | 4/2010 | Johnson | A01C 7/082 |
| | | | | 111/200 |
| 2017/0156258 | A1* | 6/2017 | Reich | A01C 7/084 |
| 2022/0210967 | A1* | 7/2022 | Janelle | F16K 11/07 |
| 2023/0189695 | A1* | 6/2023 | Gotzen | A01C 7/123 |
| | | | | 111/174 |

* cited by examiner

PRESSURE BALANCED METER ASSEMBLY AND METHOD OF USE

RELATED APPLICATIONS

This application claims priority to U.S. Provisional Application Ser. No. 63/067,938, filed Aug. 20, 2020, the disclosure of which is hereby incorporated by reference in its entirety.

FIELD OF THE DISCLOSURE

The present disclosure relates generally to optimizing air flow in an air seeder and more specifically to balancing pressure in an air seeder having a meter assembly.

BACKGROUND

Modern air seeders utilize airflow through conduits to direct commodity such as fertilizer and seed to a desired location. Typically, the commodity is stored in a tank on a cart and selectively provided to conduits to be further transported to a drill assembly or otherwise ultimately placed in the underlying soil. A meter is often positioned between the tank and the conduit to selectively distribute commodity from the tank into the conduit. There is a need for optimizing air flow in the meter assembly and balancing pressure on opposite sides of the meter.

SUMMARY

In an illustrative embodiment of the present disclosure, a meter assembly for an agricultural machine comprises: a meter having an inlet, an outlet, and a roller including cavities configured to receive commodity from the inlet and release commodity to the outlet; a first conduit fluidly coupled to the outlet of the meter and configured to receive commodity therefrom; a commodity path including the inlet, the outlet, and the cavities of the roller; and a bypass assembly including at least one passageway fluidly coupled to the meter and the conduit; the at least one passageway includes a first end fluidly coupled to the meter at one or more locations above the roller and a second end fluidly coupled to the first conduit. In some embodiments, the at least one passageway of the bypass assembly is not inclusive of any portion the commodity path.

In some embodiments, the meter assembly further comprises: a housing in which the roller is positioned, and a commodity tank coupled to the housing and configured to release commodity to the roller; the bypass assembly is positioned in the housing. In some embodiments, the housing includes an inner wall assembly and an outer wall assembly; the roller is positioned inside the inner wall assembly; and the bypass assembly is positioned outside the inner wall assembly and between the inner wall assembly and the outer wall assembly.

In some embodiments, the at least one passageway includes: a first passageway fluidly coupled at a first end to the meter at a location above the roller and at a second end to the first conduit, and a second passageway fluidly coupled at a first end to the meter at a location above the roller and at a second end to a second conduit that is fluidly coupled to the outlet of the meter and configured to receive commodity therefrom. In some embodiments, the first ends of the first and second passageways are a single duct terminating in a single aperture located above roller; and the second ends of first and second passageways are separate ducts that merge at a y-shaped split positioned between the first ends and the second ends. In some embodiments, the first and second passageways are discrete passageways.

In some embodiments, the meter assembly further comprises: a second conduit that is fluidly coupled to the outlet of the meter and configured to receive commodity therefrom; and the at least one passageway includes: (i) a first passageway fluidly coupled to the meter above the roller and to the first conduit, and (ii) a second passageway fluidly coupled to the meter above the roller and to the second conduit; and the first and second passageways are not inclusive of any portion the commodity path.

In some embodiments, the meter assembly further comprises: a first valve positioned in the first passageway and configured move from an open position to a closed position to prevent airflow between the first conduit and the meter via the first passageway; and a second valve positioned in the second passageway and configured move from an open position to a closed position to prevent airflow between the second conduit and the meter via the second passageway.

In some embodiments, the meter assembly further comprises: a housing including an inner wall assembly and an outer wall assembly; the bypass assembly is positioned between the inner wall assembly and the outer wall assembly of the housing. In some embodiments, the inner wall assembly includes a first section and a second section spaced apart from the first section; the outer wall assembly includes a first portion adjacent the first section of the inner wall assembly and a second portion adjacent the second section of the inner wall assembly; and the roller is positioned between the first section of the inner wall assembly and the second section of the inner wall assembly.

In some embodiments, the first passageway is defined between the first section of the inner wall assembly and the first portion of the outer wall assembly; and the second passageway is defined between the second section of the inner wall assembly and the second portion of the outer wall assembly. In some embodiments, the first section of the inner wall assembly the includes an upper aperture fluidly coupling the first passageway to the meter at a first location above roller; and the second section of the inner wall assembly includes an upper aperture fluidly coupling the second passageway to the meter at a second location above roller.

In some embodiments, the first end of the bypass assembly includes at least one aperture fluidly coupling the first and second passageways to the meter at one or more locations above the roller; and the second end of the bypass assembly includes a first aperture fluidly coupling the first passageway to the first conduit and a second aperture fluidly coupling the second passageway to the second conduit.

In another illustrative embodiment, a meter assembly for an agricultural machine comprises: a tank configured to store commodity; a housing supporting the tank and including an inner wall assembly and an outer wall assembly; a meter including a roller positioned in the housing and configured to receive commodity from the tank; a first conduit fluidly coupled to the meter and configured to receive commodity from the roller; and a bypass assembly including at least one passageway fluidly coupled to the meter and the first conduit; wherein the at least one passageway includes a first end fluidly coupled to the meter at one or more locations above the roller and a second end fluidly coupled to the first conduit; and the bypass assembly is defined between the inner wall assembly and the outer wall assembly of the housing.

In some embodiments, the inner wall assembly includes a first section and a second section, with the roller being defined between the first section and the second section, the first section includes a first upper face positioned above the roller and a first lower face positioned below the roller; the second section includes a second upper face positioned above the roller and a second lower face positioned below the roller; and the first and second upper faces cooperate to define boundaries of a processing side of the meter, and the first and second lower faces cooperate to define boundaries of an exhausting side of the meter.

In some embodiments, the at least one passageway is coupled to the processing side of the meter; and the first conduit is fluidly coupled to the exhausting side of the meter. In some embodiments, the at least one passageway includes a first passageway and a second passageway; the first end of the bypass assembly includes at least one aperture fluidly coupling the first and second passageways to the processing side; the second end of the bypass assembly includes a first aperture fluidly coupling the first passageway to the first conduit and a second aperture fluidly coupling the second passageway to a second conduit; and the second conduit is fluidly coupled to the exhausting side of the meter and configured to receive commodity from the roller.

In another embodiment of the present disclosure, a method of using a meter assembly comprises: rotating a roller of a meter, the roller having a plurality of cavities configured to receive and release commodity; conveying commodity along a commodity path, the commodity path including: (i) a processing side of the meter defined above the roller, (ii) at least one cavity of the roller, (iii) an exhausting side of the meter defined below the roller, and (iv) a plurality of conduits fluidly coupled to the exhausting side of the meter; and facilitating air flow through at least one passageway that is substantially devoid of commodity and fluidly coupled to the processing side of the meter and the plurality of conduits. The at least one passageway is coupled to the plurality of conduits upstream of where the plurality of conduits couple to the exhausting side of the meter.

In some embodiments, the method of using a meter assembly further comprises: delivering commodity from a tank to the plurality of cavities of the roller; the tank is coupled to a housing of the meter; and the roller and the at least one passageway are position in the housing of the meter.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
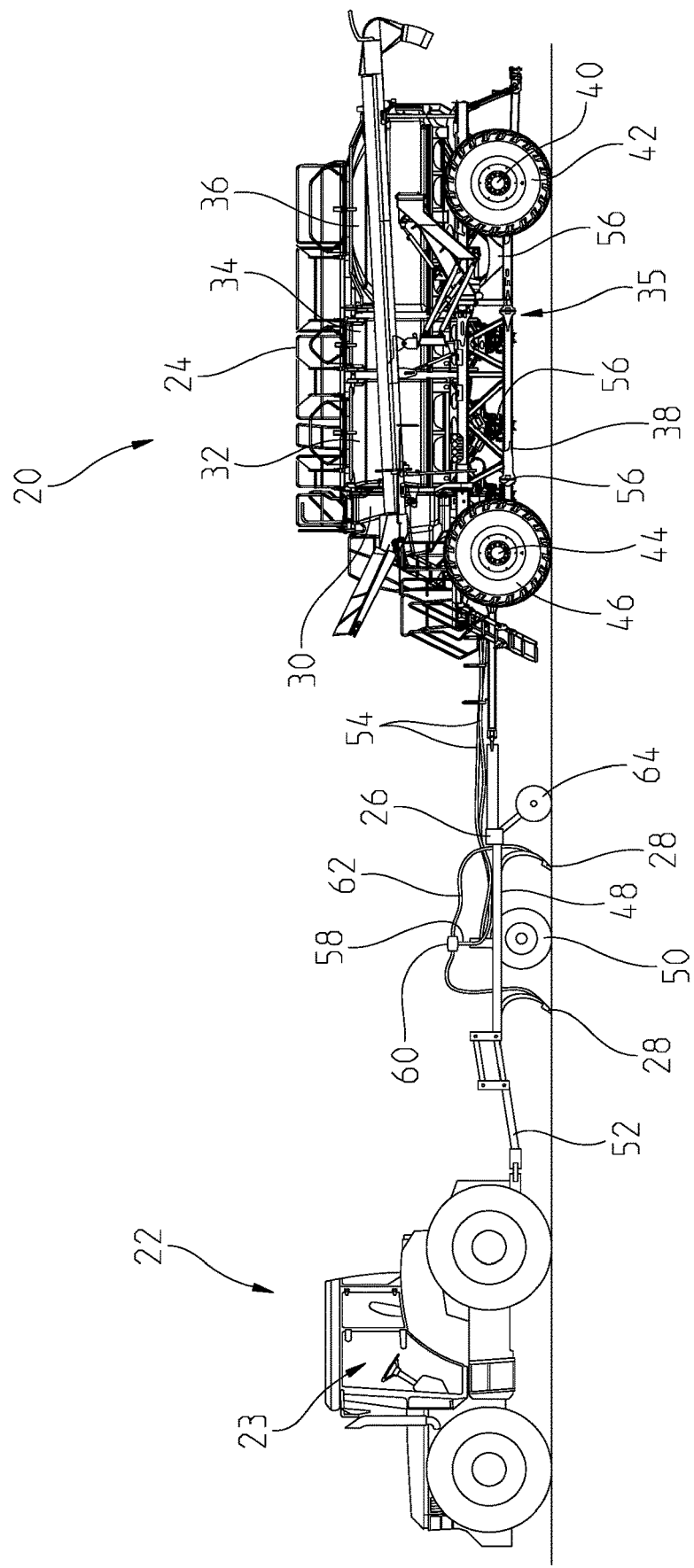
FIG. 1 is a side view of a towed cart and prime mover along with an attached implement.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

An air or pneumatic seeder 20 is shown in FIG. 1 towed by a tractor or prime mover 22. The seeder 20 includes an air cart 24, also known as a commodity cart, having one or more tanks for one or more commodities to be applied to the soil, and a drill or implement 26 which applies the commodity to the soil. The drill has a plurality of ground engaging tools 28. The cart 24 is shown with four tanks 30, 32, 34, and 36 mounted on a frame 38. The frame 38 is supported on a rear axle 40 having wheels/tires 42 at the rear of the frame 38. Depending on the cart configuration, additional axles may be provided, such as front axle 44 and wheels/tires 46. The axles and wheels support the cart frame 38 for movement over the ground surface towed by tractor 22. Any number of tanks can be provided on the air cart. The term "cart" should be broadly construed to include any device towed by a prime mover that is supported on one or more axles, such as a trailer, wagon, cart, implement, etc.

The drill 26 includes a frame 48 supported by ground wheels 50 and is connected to the rear of the tractor 22 by a tongue 52. As shown, the cart 24 is known as a "tow behind" cart meaning that the cart follows the drill. In alternative arrangements, the cart may be a "tow between" cart meaning that the cart is between the tractor 22 and drill 26. In yet a further possible arrangement, the air cart and drill can be combined onto a common frame. The tanks 30, 32, 34, and 36 can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

A pneumatic distribution system 35 includes a fan located behind the front tires 46, connected to a product delivery conduit structure having multiple product flow conduits 54. The fan directs air through the conduits 54. A product meter assembly 56 is located at the bottom of each tank and delivers product from the tanks at a controlled rate to the conduits 54 and the air stream moving through the conduits 54.

Each conduit 54 carries product in the air stream to a secondary distribution tower 58 on the drill 26. Typically, there will be one tower 58 for each conduit 54. Each tower 58 includes a secondary distributing manifold 60 located at the top of a vertical tube. The distributing manifold 60 divides the flow of product into a number of secondary distribution lines 62. Each secondary distribution line 62 delivers product to one of a plurality of ground engaging tools 28 which opens a furrow in the soil and deposits the product therein. The number of conduits 54 may vary from one to eight or ten or more, depending on the configuration of the cart and drill. Depending on the cart and drill, there may be two distribution manifolds in the air stream between the meters and the ground engaging tools. Alternatively, in some configurations, the product is metered directly from the tank into secondary distribution lines 62 leading to the ground engaging tools 28 without an intermediate distribution manifold.

A firming or closing wheel 64 associated with each tool 28 trails the tool and firms the soil over the product deposited in the soil. Various types of tools 28 may be used including, tines, shanks, disks, etc. The tools 28 are movable between a lowered position engaging the ground and a raised position above the ground. Each tool may be configured to be raised by a separate actuator. Alternatively, multiple tools 28 may be mounted to a common rockshaft for movement together. In yet another alternative, the tools 28 may be fixed to the frame 38 and the frame 38 raised and lowered by linkages on each of the drill wheels 50.

Figure 2:
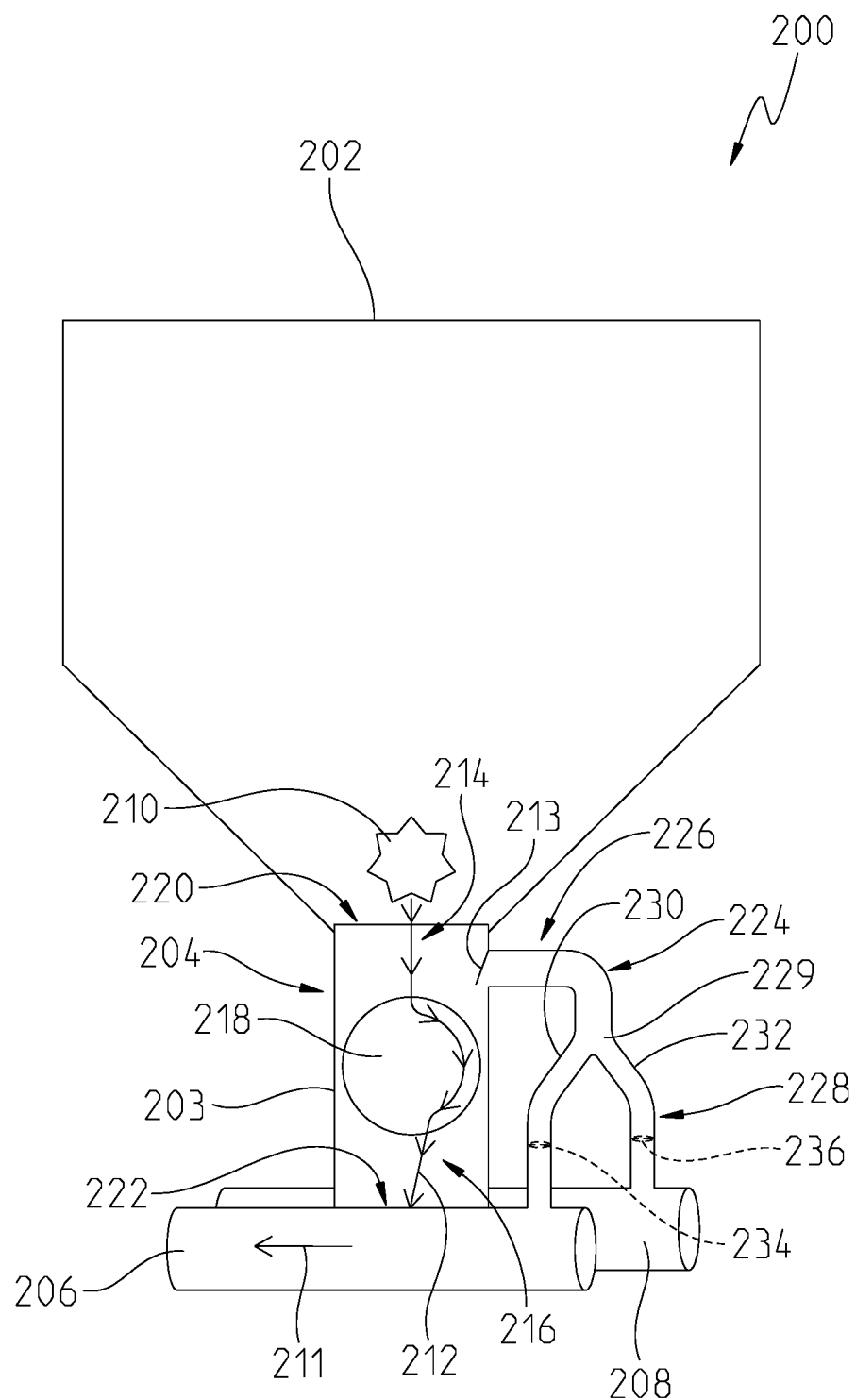
FIG. 2 is a schematic view of a meter assembly.

Referring now to the illustrative embodiment shown in FIG. 2, a schematic view of a meter assembly 200 is shown. The meter assembly 200 may have a reservoir or tank 202 coupled to a meter 204. The tank 202 may be any of the tanks 30, 32, 34, and 36 and be sized to contain commodity therein and direct the commodity to the meter 204. Commodity may refer to seed, fertilizer, or other nutrients and the like that promote growing a crop. The meter 204 may be representative of the product meter assembly 56. Further, the meter 204 may selectively distribute commodity from the tank 202 to a first or second conduit 206, 208. In one aspect of this disclosure, the meter 204 may have a run selector, flapper, or the like that is selectively repositionable to distribute commodity from the tank 202 into either one of the first conduit 206 or the second conduit 208 depending on the position of the flapper. This is described in greater herein with reference to FIG. 6.

While two conduits 206, 208 are illustrated herein, this disclosure contemplates embodiments with more than two conduits coupled to the meter 204. Further still, there may be only one conduit coupled to the meter 204. As will be understood in view of this disclosure, the teachings discussed herein are applicable to meters having any number of conduits coupled thereto.

In illustrative embodiments, the tank 202 may have an agitator 210 positioned in or on the tank 202. The agitator 210 may be a rotary agitator having extensions that extend radially away from a rotation axis. The agitator 210 may interact with the tank 202 to agitate any commodity therein to ensure the commodity is properly fed into the meter 204. While a rotary agitator is discussed herein, this disclosure contemplates any known commodity agitator for the agitator 210.

In illustrative embodiments, the meter 204 may have a housing 203 shaped to surround or enclose certain other components of the meter 204 and/or the meter assembly 200. In illustrative embodiments, the meter 204 may have a roller 218 positioned within the housing 203. The roller 218 may selectively distribute commodity from an inlet 220 to an outlet 222 of the housing 203. The roller 218 may rotate about an axis and have a plurality of cavities 604 (see FIGS. 5 and 6) spaced circumferentially there about. Each of the plurality of cavities 604 may have a radially distal opening that allows commodity to enter and exit each of the plurality of cavities 604 as the roller 218 rotates. Accordingly, commodity positioned at the inlet 220 may fall by gravity and/or by air flow into one of the cavities 604 of the roller 218 as the roller 218 rotates. Next, as the roller cavity 604 having the commodity rotates about its axis towards the outlet 222, the commodity may fall out of the cavity 604 as gravity, radial forces, and/or air flow move the commodity towards the outlet 222. Accordingly, the commodity may be distributed in a metered fashion from the inlet 220 to the outlet 222 by the roller 218.

More specifically, the meter 204 may be designed to process commodity along a commodity path 212 from the tank 202 to the conduits 206, 208. The commodity path 212 may be the typical path of the commodity as the roller 218 rotates to transfer commodity from the tank 202 to the conduits 206, 208. For example, the commodity path 212 may the cavities 604 of the roller 218, a processing side 214 of the meter 204, and an exhausting side 216 of the meter 204. The processing side 214 of the meter 204 is the location wherefrom the cavities 604 of the roller 218 are expected to receive commodity as the roller 218 rotates. The exhausting side 216 of the meter 204 is the location where to the cavities 604 of the roller 218 typically release commodity under proper operating conditions. In the illustrative embodiment, the processing side 214 of the meter 204 is positioned above the roller 218, and the exhausting side 216 of the meter 204 is positioned below the roller 218. In the illustrative embodiment, the processing side 214 of the meter 204 is positioned between the tank 202 and the roller 218. Further, the exhausting side 216 of the meter 204 is positioned between the meter 204 and the conduits 206, 208.

In some embodiments, the meter assembly 200 is not a positive displacement meter, and it has been demonstrated that this type of meter assembly 200 is sensitive to air pressure differentials across the meter 204. Therefore, there is a need to balance the pressure across the meter 204 and pressurize the tank 202 through the meter 204. While one solution is to allow the needed pressure balancing to occur through the flow path of the commodity 212, this may result in a slowed rate of air flow due to interference by the commodity. Therefore, another solution is to introduce a dedicated path or bypass to facilitate pressure balanced air flow across the meter 204, as described below.

In illustrative embodiments, the meter assembly 200 may include a bypass assembly 224. The bypass assembly 224 forms at least one continuous passageway from the processing side 214 or the tank 202 to at least one of the conduits 206, 208. The bypass assembly 224 does not include or pass through the cavities 604 of the roller 218. The bypass assembly 224 communicates air flow between the tank 202 and the conduits 206, 208 substantially without the interference from commodity that is passing along the commodity path 212. In other words, the bypass assembly 224 is substantially devoid of commodity. Without interference from the roller 218 and the commodity, the bypass assembly 224 effectively balances or equalizes pressure on opposing sides 214, 216 of the roller 218.

In the illustrative embodiment shown in FIG. 2, the bypass assembly 224 includes a first side 226 fluidly coupled to the processing side 214 and second side 228 fluidly coupled to the conduits 206, 208. In the illustrative embodiment, the bypass assembly 224 includes a y-shaped split 229 between the first side 226 and the second side 228. The second side 228 includes a first leg 230 fluidly coupled to the conduit 206 and a second leg 232 fluidly coupled to the conduit 208. The first leg 230 includes a first valve 234 therein, and the second leg 232 includes a second valve 236 therein. The valves 234, 236 are positioned in parallel. The first and second valves 234, 236 may be, for example, butterfly valves or any other valve suitable for opening and closing to form an air-tight seal on opposing sides thereof. The valves 234, 236 may be operated independently from one another, either manually or with a controller (not shown)

to facilitate or prevent communication between: (a) the one or more conduits 206, 208 and (b) the processing side 214 and the tank 202 of the meter assembly 200. It should be appreciated that while FIG. 2 shows the first side 226 of the bypass assembly 224 opening to the processing side 214, the first side 226 of the bypass assembly 224 may also open directly to the tank 202.

As shown in FIG. 2, in the illustrative embodiment, air flows through the conduits 206, 208 in the direction indicated by the arrow 211. The bypass assembly 224 is fluidly coupled to the conduits 206, 208 at a location along the conduits 206, 208 that is upstream of the location where the meter 204 is fluidly coupled to the conduits 206, 208. This ensures that air flow from the conduits 206, 208 to the meter 204 does not recirculate commodity received by the conduits 206, 208.

In some embodiments, the meter assembly 200 may include an isolation mechanism 213 configured to prevent commodity from entering the bypass assembly 224. The isolation mechanism 213 may be, for example, a deflector and/or a filter. In embodiments in which the isolation mechanism 213 is a deflector, the deflector extends into the processing side 214 to deflect commodity away from the bypass assembly 224 to the roller 218. In embodiments in which the isolation mechanism 213 is a filter, the filter allows the passage of air flow and prevents the passage of commodity between the processing side 214 of the meter 204 and the bypass assembly 224.

In the illustrative embodiment shown in FIG. 2, the bypass assembly 224 is disposed outside the housing 203. The bypass assembly 224 also may be disposed within the housing as shown in the illustrative embodiment depicted in FIGS. 3-6. Although some components in the schematic views of FIGS. 2 and 3 are not drawn to scale, it should be appreciated that identical reference numbers are used to identify the same components in FIGS. 2 and 3 and otherwise herein.

Figure 3:
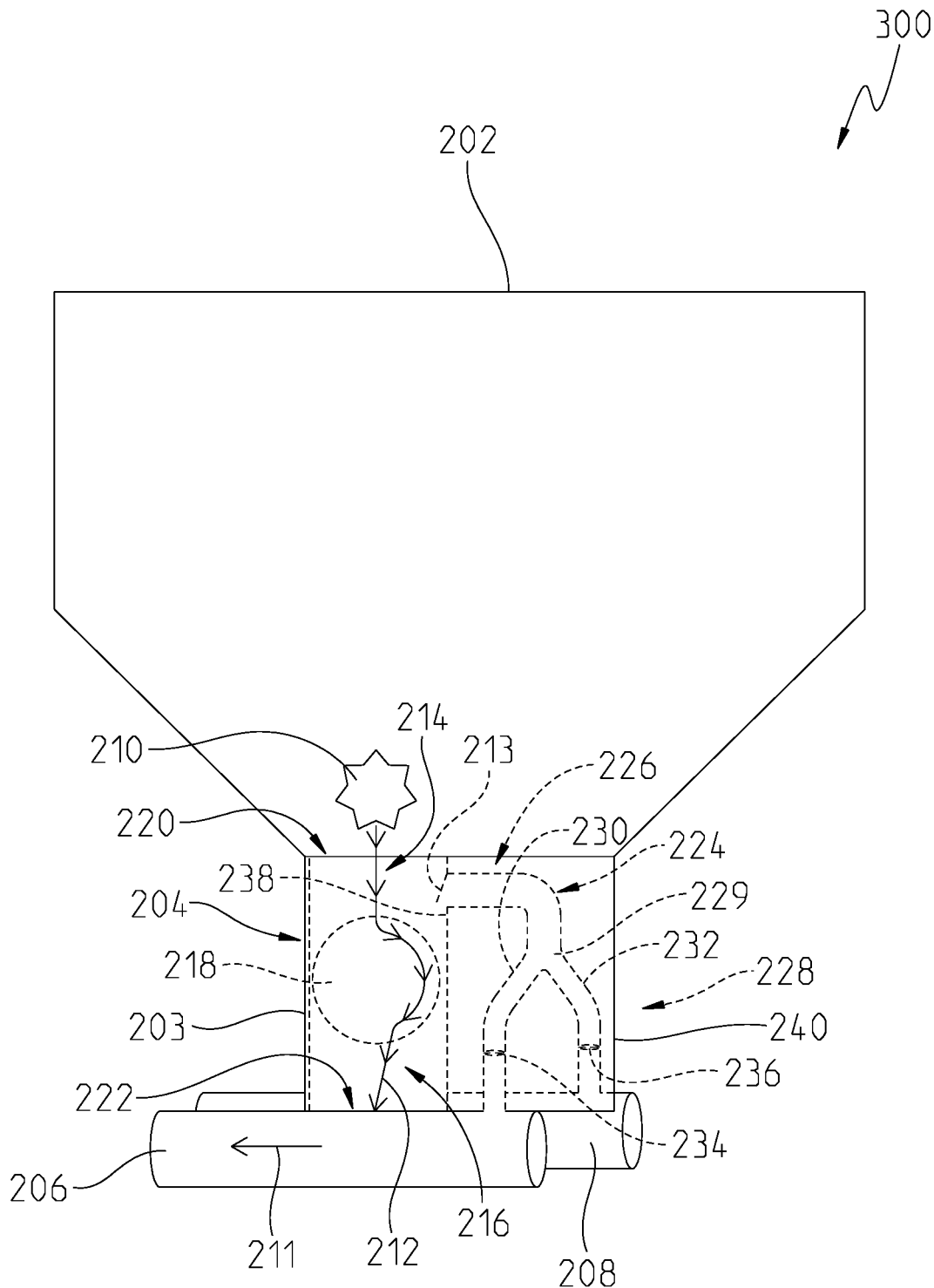
FIG. 3 is a schematic view of another meter assembly.

FIG. 3 illustrates a meter assembly 300. As shown in FIG. 3, the housing 203 includes an inner wall assembly 238 and an outer wall assembly 240. The roller 218 is positioned inward of the inner wall assembly 238. The bypass assembly 224 is positioned outward of the inner wall assembly 238 and between the inner wall assembly 238 and the outer wall assembly 240.

In the illustrative embodiments shown in FIGS. 2 and 3, the bypass assembly 224 includes a y-shaped split 229 connecting the legs 230 and 232. In some embodiments, the legs of the bypass assembly are not connected. For example, in the illustrative embodiment shown in FIGS. 4 and 6, a first leg 430 and a second leg 432 are separate and distinct legs that each form a continuous path fluidly coupling the conduits 206, 208 to the processing side 214 or the tank 202 of the meter assembly 200.

Figure 4:
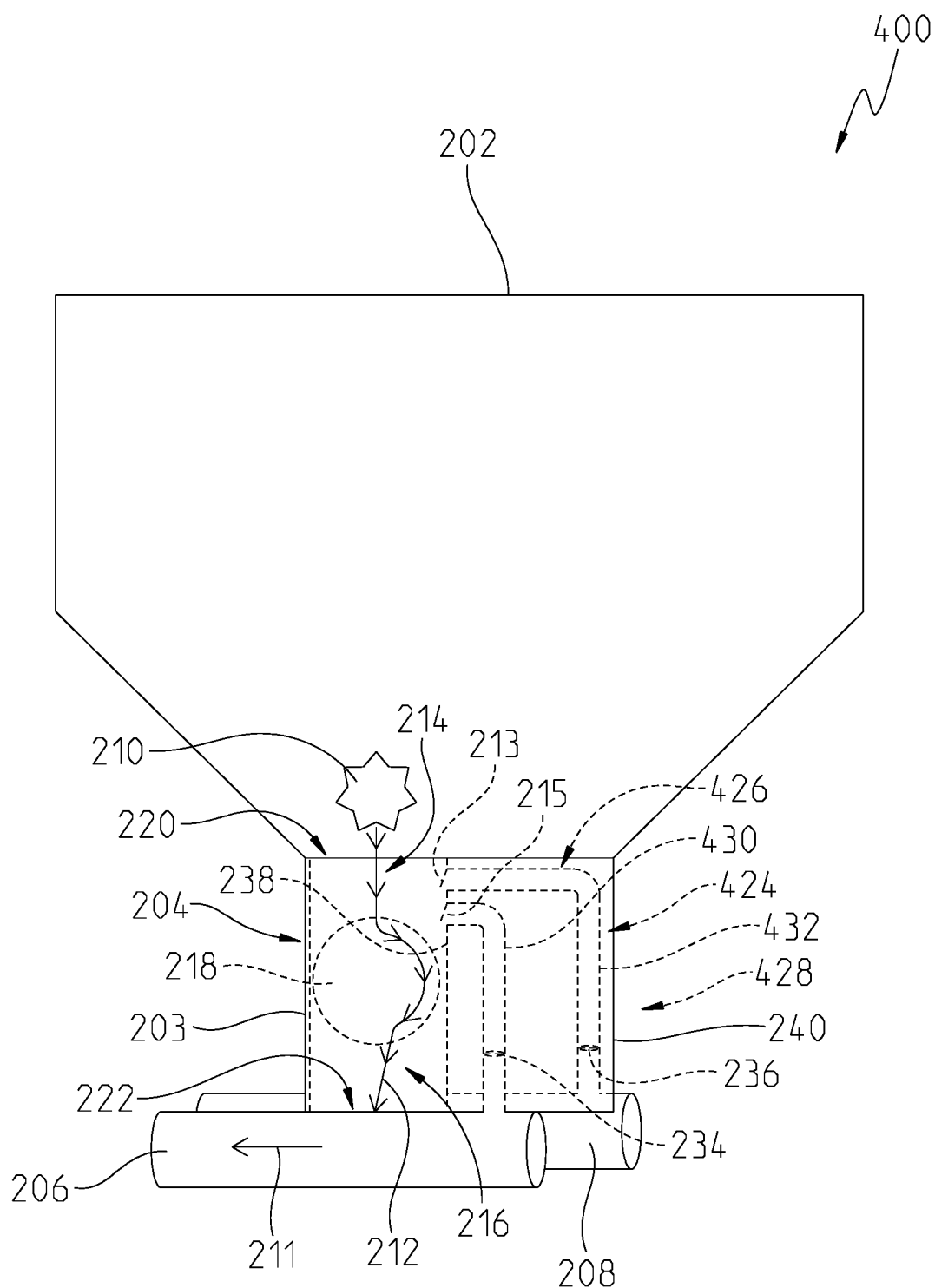
FIG. 4 is a schematic view of another meter assembly.

FIG. 4 illustrates a meter assembly 400. As shown in FIG. 4, the meter assembly 400 includes a bypass assembly 424 that does not include or pass through the cavities 604 of the roller 218. The bypass assembly 424 communicates air flow between the tank 202 and the conduits 206, 208 substantially without the interference from commodity that is passing along the commodity path 212. The presence of the bypass assembly 424 effectively balances or equalizes pressure on opposing sides 214, 216 of the roller 218. The bypass assembly 424 is positioned inside the housing 203. Specifically, the bypass assembly 424 is positioned between the inner wall assembly 238 and the outer wall assembly 240 of the housing 203.

In the bypass assembly 424, the legs 430 and 432 may be referred to as discrete passageways 430 and 432 each extending from a first side 426 to a second side 428 of bypass assembly 424 without connecting to one another. In other words, each passageway 430, 432 has its own inlet aperture and its own outlet aperture. Similar to the bypass assembly 224, the bypass assembly 424 is arranged such that the first side 426 is fluidly coupled to the processing side 214 or the tank 202 and second side 428 is fluidly coupled to the conduits 206, 208. In other words, a first side of each passageway 430, 432 is coupled to the processing side 214 or the tank 202, a second side of each passageway 430, 432 is coupled to the conduits 206, 208.

As shown in FIG. 4, in the illustrative embodiment, air flows through the conduits 206, 208 in the direction indicated by the arrow 211. The bypass assembly 424 is fluidly coupled to the conduits 206, 208 at a location along the conduits 206, 208 that is upstream of the location where the meter 204 is fluidly coupled to the conduits 206, 208. This ensures that air flow from the conduits 206, 208 to the meter 204 does not recirculate commodity received by the conduits 206, 208.

In some embodiments, the meter assembly 400 may include isolation mechanisms 213, 215 configured to prevent commodity from entering the bypass assembly 424. The isolation mechanisms 213, 215 may be, for example, deflectors and/or filters 213, 215. In embodiments in which the isolation mechanism 213, 215 are deflectors, the deflectors extend into the processing side 214 to deflect commodity away from the bypass assembly 424 to the roller 218. In embodiments in which the isolation mechanism 213, 215 are filters, the filters allow the passage of air flow and prevent the passage of commodity between the processing side 214 of the meter 204 and the bypass assembly 424.

Figure 5:
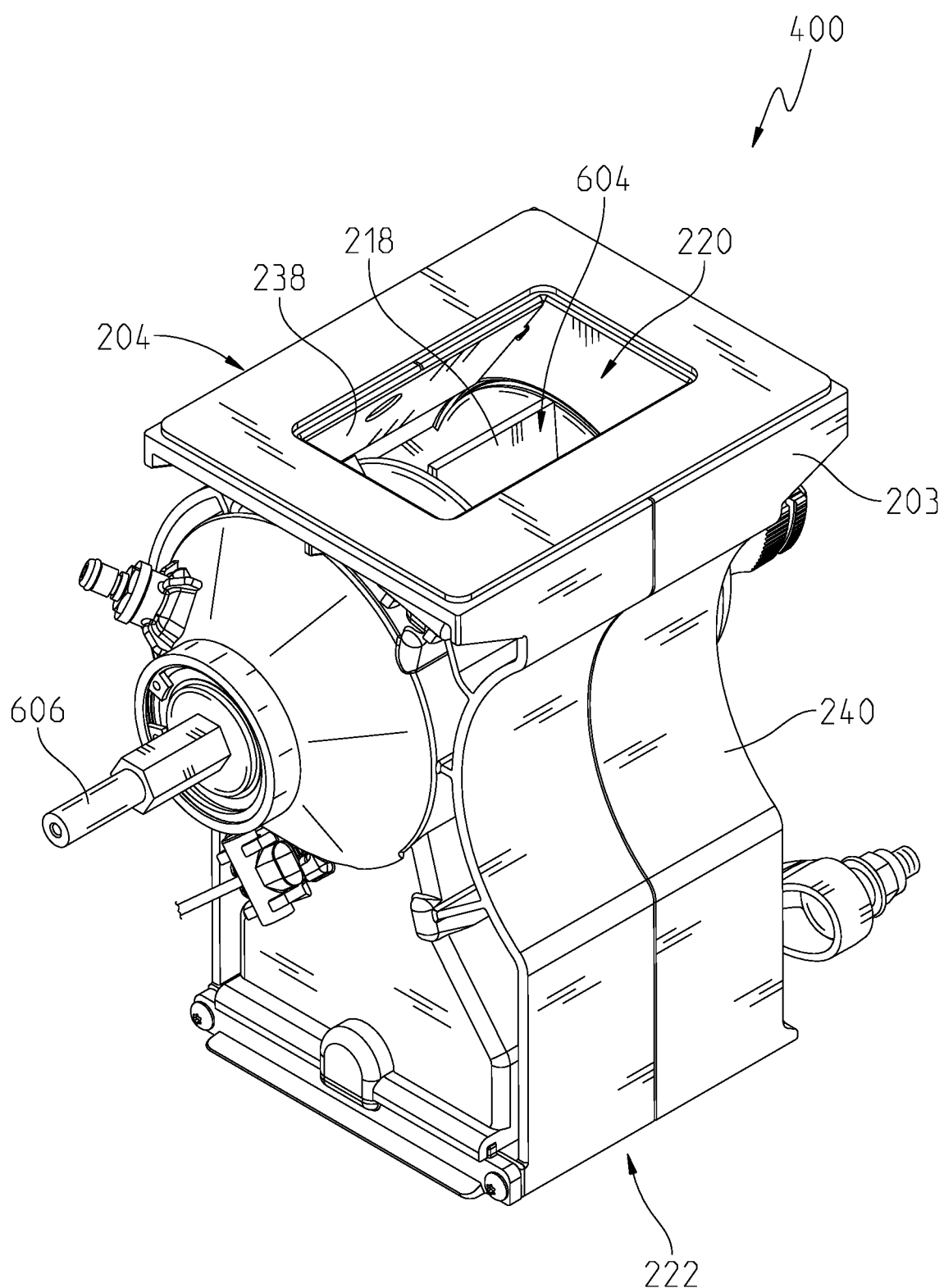
FIG. 5 is a perspective view of the meter assembly of FIG. 4.

Referring now to FIG. 5, the meter assembly 400 is depicted showing the meter 204 separated from the tank 202, conduits 206, 208, and other portions of the seeder 20. Specifically, FIG. 5 shows a perspective view of the roller 218 disposed in the housing 203. The roller 218 is positioned between opposing faces of the inner wall assembly 238, as will be described in greater detail below. The meter 204 and/or the housing 203 of the meter 204 may have an inlet 220, an outlet 222, and the roller 218 is positioned between the inlet 220 and the outlet 222 as discussed herein. The roller 218 may have a roller shaft 606 that extends through an orifice of the meter housing 203. The roller shaft 606 is coupled to a roller motor (not shown) to drive rotation of the roller shaft 606, and thus, the roller 218. The roller motor may be an electrical, hydraulic, or pneumatic motor that selectively rotates the roller 218. The outer wall assembly 240 of the meter housing 203 is positioned outside and adjacent to corresponding portions of the inner wall assembly 238, as will be described in greater detail with respect to FIG. 6.

Figure 6:
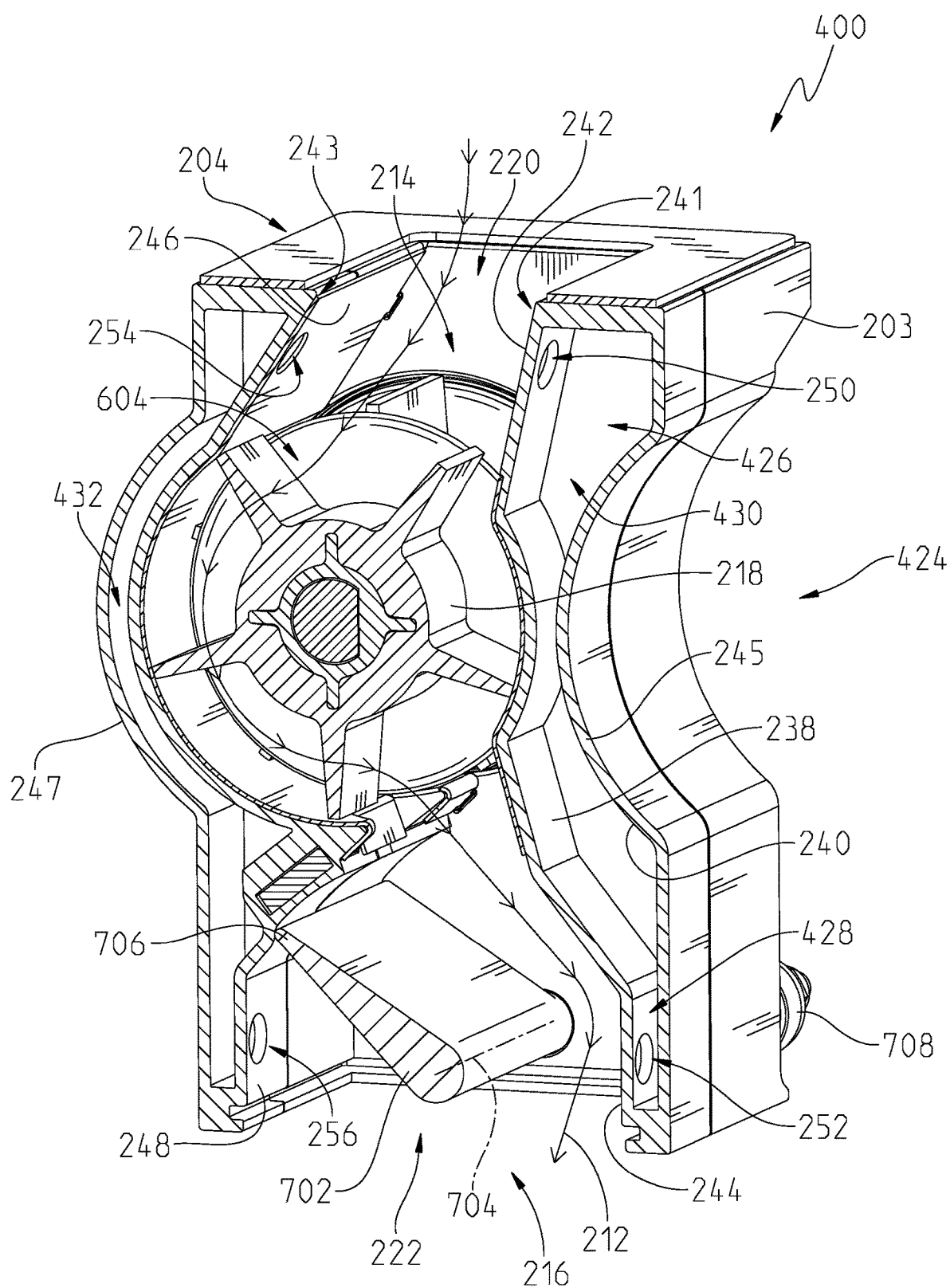
FIG. 6 is a cross-section view of the meter assembly of FIGS. 4 and 5.

Referring now to FIG. 6, a partial section view is shown. As shown in FIG. 6, the housing 203 includes an inner wall assembly 238 and an outer wall assembly 240. The inner wall assembly 238 includes a plurality of sections and each section includes a plurality of faces. For example, the inner wall assembly 238 includes a first section 241 extending vertically the length of the housing 203 from the inlet 220 to the outlet 222. The inner wall assembly 238 also includes a second section 243 spaced apart from the first section 241 and extending vertically the length of the housing 203 from the inlet 220 to the outlet 222. The roller 218 is positioned between the first section 241 and the second section 243 of the inner wall assembly 238. The first section 241 of the inner wall assembly 238 includes, for example, an upper face 242 positioned above the roller 218 and a lower face 244 positioned below the roller 218. The second section 243 of the inner wall assembly 238 includes, for example, an upper face 246 positioned above the roller 218 and a lower face 248 positioned below the roller 218. The opposing upper faces 242, 246 cooperate to define boundaries of the processing side 214 of the meter 204. The lowering opposing faces 244, 248 cooperate to define boundaries of the exhausting side 216 of the meter 204.

In the illustrative embodiment, the meter 204 includes a flapper 702. The flapper 702 is pivotally coupled to the housing 203, either directly or through a manifold coupled to the housing 203, to pivot about a flapper axis 704 between a first position and a second position. In the first position (not shown) a distal end 706 of the flapper 702 abuts the first section 241 to direct commodity to one of the conduits 206, 208. In the second position (see FIG. 6) the distal end of the flapper 702 abuts the second section 243 to direct commodity to the other of the conduits 206, 208.

The position of the flapper 702 may be selectively controlled by a flapper arm 708. More specifically, the flapper arm 708 may be coupled to an actuator or the like to selectively pivot the flapper 702 between the first position and the second position. While a flapper 702 is illustrated coupled to the housing 203 as discussed herein, this disclosure considers positioning the flapper 702 in a manifold coupled to the meter housing as well. In this configuration, the flapper 702 and corresponding components may be positioned in the manifold which can be selectively coupled to the housing 203. Further still, this disclosure also considers utilizing a turret type run selector. The turret style run selector may be a rotary run selector that alters the flow path of commodity as it rotates about a rotation axis. Accordingly, this disclosure contemplates utilizing different types of run selectors either coupled directly to the meter housing 203 or to a manifold coupled thereto.

Referring still to FIG. 6, the meter housing 203 may be a molded material, such as plastic, and formed from two separate sections coupled to one another. The meter housing 203 may form a passageway for commodity between the inlet 220 and the outlet 222 that is metered by the rotation of the roller 218. As described above, the passageway for commodity may be referred to as a commodity path 212. The commodity path 212 may include the cavities 604 of the roller 218, and therefore, the commodity path 212, like the roller 218, is positioned between opposing sections 241, 243 of the inner wall assembly 238.

As shown in FIG. 6, the discrete passageways 430 and 432 are positioned between the inner wall assembly 238 and the outer wall assembly 240. For example, the discrete passageway 430 may be defined between the first section 241 of the inner wall assembly 238 and a first portion 245 of the outer wall assembly 240. The discrete passageway 432 may be defined between the second section 243 of the inner wall assembly 238 and a second portion 247 of the outer wall assembly 240. As shown in FIG. 6, the first section 241 of the inner wall assembly 238 is adjacent the first portion 245 of the outer wall assembly 240, and second section 243 of the inner wall assembly 238 is adjacent the second portion 247 of the outer wall assembly 240.

In the illustrative embodiment, the discrete passageway 430 includes (at one end) an aperture 250 defined in the upper face 242 of the inner wall assembly 238. The aperture 250 opens into the processing side 214. In some embodiments, the aperture 250 opens directly into the tank 202, as described herein. The discrete passageway 430 includes (at the other end) an aperture 252 defined in the lower face 244 of the inner wall assembly 238. The aperture 252 opens into the exhausting side 216.

In the illustrative embodiment, the discrete passageway 432 includes (at one end) an aperture 254 defined in the upper face 246 of the second section 243 of the inner wall assembly 238. The aperture 254 opens into the processing side 214. In some embodiments, the aperture 254 opens directly into the tank 202, as described herein. The discrete passageway 432 includes (at the other end) an aperture 256 defined in the lower face 248 of the inner wall assembly 238. The aperture 256 opens into the exhausting side 216. It should be appreciated that the discrete passageways 430 and 432 are in fluidly coupled to the conduits 206, 208 respectively (although not shown in FIG. 6, see FIG. 4). As such, additional tubes, pipes, or other walled structures may fluidly couple the apertures 252, 256 to the conduits 206, 208 or the apertures 252, 256 may open directly to the conduits 206, 208.

While FIG. 6 illustratively shows apertures 250, 252, 254, 256 opening direct to cavities defined between sections of the inner wall assembly 238 and portions of the outer wall assembly 240, it should be appreciated that in some embodiments, the apertures 250, 252, 254, 256 may open instead to additional tubes, pipes, or other walled structures positioned in the space between the inner and outer wall assemblies 238, 240.

FIG. 6 illustratively shows: (i) the first passageway 430 positioned between the first section 241 of the inner wall assembly 238 and the first portion 245 of the outer wall assembly 240, and (ii) the second passageway 432 positioned between the second section 243 of the inner wall assembly 238 and the second portion 247 of the outer wall assembly 240; however, in some embodiments, the first and second passageways 430, 432 may both be positioned either: (a) between the first section 241 of the inner wall assembly 238 and the first portion 245 of the outer wall assembly 240, or (b) between the second section 243 of the inner wall assembly 238 and the second portion 247 of the outer wall assembly 240. In that case, the passageways 430, 432 may have a single aperture positioned at the first end of the bypass assembly (similar to FIG. 3) and/or one aperture for each corresponding conduit 206, 208 positioned at the second end of the bypass assembly.

In any event, the one or more apertures at the first end 426 of the bypass assembly 424 open to one or more locations above the roller 218, and the passageways 430, 432 are each fluidly coupled (at the second end 428 of the bypass assembly) to a separate conduit 206, 208.

It should be appreciated that, in some embodiments, each passageway is fluidly coupled to a separate conduit 206, 208, so that the conduits 206, 208 can be pressurized or depressurized selectively and independently by virtue of being isolated from one another.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A meter assembly for an agricultural machine, comprising:
   a meter having an inlet, an outlet, and a roller including cavities configured to receive commodity from the inlet and release commodity to the outlet;
   a commodity tank configured to release commodity to the roller;
   a first conduit fluidly coupled to the outlet of the meter and configured to receive commodity therefrom;
   a commodity path including the inlet, the outlet, and the cavities of the roller; and
   a bypass assembly including at least one passageway fluidly coupled to the meter and the first conduit so as to bypass the commodity path to pressure balance the meter;
   wherein the bypass assembly includes a first end fluidly coupled to the meter above the roller and a second end fluidly coupled to the first conduit; and
   wherein the at least one passageway opens to the meter at a location above the roller and below the commodity tank.

2. The meter assembly of claim 1, wherein the at least one passageway of the bypass assembly is not inclusive of any portion the commodity path.

3. The meter assembly of claim 1, further comprising: a housing in which the roller is positioned;
   wherein the commodity tank is coupled to the housing; and
   wherein the bypass assembly is positioned in the housing.

4. The meter assembly of claim 3, wherein the housing includes an inner wall assembly and an outer wall assembly;
   wherein the roller is positioned inside the inner wall assembly; and
   wherein the bypass assembly is positioned outside the inner wall assembly and between the inner wall assembly and the outer wall assembly.

5. The meter assembly of claim 1, wherein the at least one passageway includes:
   a first passageway fluidly coupled to the meter above the roller and fluidly coupled to the first conduit, and
   a second passageway fluidly coupled to the meter above the roller and coupled to a second conduit that is also fluidly coupled to the outlet of the meter and configured to receive commodity therefrom.

6. The meter assembly of claim 5, wherein the first and second passageways are discrete passageways disconnected from one another.

7. The meter assembly of claim 5, wherein the bypass assembly includes a y-shaped split positioned between the first end and the second end thereof.

8. The meter assembly of claim 1, further comprising:
   a second conduit that is fluidly coupled to the outlet of the meter and configured to receive commodity therefrom;
   wherein the second end of the bypass assembly) is coupled to the second conduit; and
   wherein the bypass assembly is not inclusive of any portion the commodity path.

9. The meter assembly of claim 8, further comprising:
   a first valve positioned in the bypass assembly and configured move from an open position to a closed position to prevent airflow between the first conduit and the meter; and
   a second valve positioned in the bypass assembly and configured to move from an open position to a closed position to prevent airflow between the second conduit and the meter.

10. The meter assembly of claim 8, further comprising:
    a housing including an inner wall assembly and an outer wall assembly;
    wherein the bypass assembly is positioned between the inner wall assembly and the outer wall assembly of the housing.

11. The meter assembly of claim 10, wherein the inner wall assembly includes a first section and a second section spaced apart from the first section;
    wherein the outer wall assembly includes a first portion adjacent the first section of the inner wall assembly and a second portion adjacent the second section of the inner wall assembly; and
    wherein the roller is positioned between the first section of the inner wall assembly and the second section of the inner wall assembly.

12. The meter assembly of claim 11, wherein the at least one passageway includes:
    a first passageway is defined between the first section of the inner wall assembly and the first portion of the outer wall assembly; and
    a second passageway defined between the second section of the inner wall assembly and the second portion of the outer wall assembly.

13. The meter assembly of claim 12, wherein the first section of the inner wall assembly includes a first processing side aperture fluidly coupling the first passageway to the meter above the roller; and
    wherein the second section of the inner wall assembly includes a second processing side aperture fluidly coupling the second passageway to the meter above the roller.

14. The meter assembly of claim 10, wherein the at least one passageway includes a first passageway and a second passageway; and
    wherein the second end of the bypass assembly includes a first exhausting side aperture fluidly coupling the first passageway to the first conduit and a second side aperture fluidly coupling the second passageway to the second conduit.

15. A meter assembly for an agricultural machine, comprising:
    a tank configured to store commodity;
    a housing coupled to the tank and including an inner wall assembly and outer wall assembly;
    a meter including a roller positioned in the housing and configured to receive commodity from the commodity tank;
    a first conduit fluidly coupled to the meter and configured to receive commodity from the roller; and
    a bypass assembly including at least one passageway fluidly coupled to the meter and the first conduit so as to bypass the roller to pressure balance the meter;
    wherein the bypass assembly includes a first end fluidly coupled to the meter at one or more locations above the roller and a second end fluidly coupled to the first conduit;
    wherein the bypass assembly is defined between the inner wall assembly and the outer wall assembly of the housing; and
    wherein the at least one passageway opens to the meter at a location above the roller and below the commodity bank.

16. The meter assembly of claim 15, wherein the inner wall assembly includes a first section and a second section, with the roller being defined between the first section and the second section;

wherein the first section includes a first upper face positioned above the roller and a first lower face positioned below the roller;

wherein the second section includes a second upper face positioned above the roller and a second lower face positioned below the roller; and wherein the first and second upper faces cooperate to define boundaries of a processing side of the meter, and the first and second lower faces cooperate to define boundaries of an exhausting side of the meter.

17. A method of using a meter assembly comprising:

rotating a roller of a meter, the roller having a plurality of cavities configured to receive and release commodity;

conveying commodity along a commodity path, the commodity path including: (i) a processing side of the meter defined above the roller, (ii) at least one cavity of the roller, (iii) an exhausting side of the meter defined below the roller, and (iv) a plurality of conduits fluidly coupled to the exhausting side of the meter; and facilitating air flow through at least one passageway that is substantially devoid of commodity and fluidly coupled to the processing side of the meter and the plurality of conduits to pressure balance the meter;

wherein the at least one passageway is coupled to the plurality of conduits upstream of where the plurality of conduits couple to the exhausting side of the meter.

18. The method of claim 17, further comprising:

delivering commodity from a tank to the plurality of cavities of the roller;

wherein the tank is coupled to a housing of the meter; and wherein the roller and the at least one passageway are position in the housing of the meter.

\* \* \* \* \*